(12) United States Patent
Minadeo et al.

(10) Patent No.: US 11,725,633 B2
(45) Date of Patent: Aug. 15, 2023

(54) PITCH BEARING FOR A WIND TURBINE

(71) Applicant: General Electric Company, Schenectady, NY (US)

(72) Inventors: Adam Daniel Minadeo, Greenville, SC (US); Michael Joseph Kacmarcik, Simpsonville, SC (US); Bhavesh Kachhia, Bangalore (IN)

(73) Assignee: General Electric Company, Schenectady, NY (US)

( * ) Notice: Subject to any disclaimer, the term of this patent is extended or adjusted under 35 U.S.C. 154(b) by 360 days.

(21) Appl. No.: 15/471,587

(22) Filed: Mar. 28, 2017

(65) Prior Publication Data

US 2018/0283362 A1 Oct. 4, 2018

(51) Int. Cl.
| | |
|---|---|
| F03D 80/70 | (2016.01) |
| F16C 33/60 | (2006.01) |
| F03D 1/06 | (2006.01) |
| F03D 7/02 | (2006.01) |
| F16C 19/10 | (2006.01) |

(52) U.S. Cl.
CPC ........... *F03D 80/70* (2016.05); *F03D 1/0658* (2013.01); *F03D 7/0224* (2013.01); *F16C 19/10* (2013.01); *F16C 33/60* (2013.01); *F05B 2260/79* (2013.01); *F16C 2226/60* (2013.01); *F16C 2300/14* (2013.01); *F16C 2360/31* (2013.01); *Y02E 10/72* (2013.01)

(58) Field of Classification Search
CPC ...... F03D 1/0658; F03D 7/0224; F03D 80/70; F05B 2260/79; F16C 19/08; F16C 19/10; F16C 2226/60; F16C 2300/14; F16C 2360/31
See application file for complete search history.

(56) References Cited

U.S. PATENT DOCUMENTS

| 8,876,477 | B2 | 11/2014 | Bech et al. |
| 9,188,107 | B2* | 11/2015 | Minadeo ................. F03D 80/70 |
| 2007/0104577 | A1* | 5/2007 | Hansen ................. F03D 7/0224 |
| | | | 416/104 |

(Continued)

FOREIGN PATENT DOCUMENTS

| DE | 102009035749 A1 | 2/2011 |
| DE | 202012002913 | 4/2012 |

(Continued)

OTHER PUBLICATIONS

International Search Report, dated Jan. 30, 2019.

(Continued)

*Primary Examiner* — Charles G Freay
*Assistant Examiner* — Lilya Pekarskaya
(74) *Attorney, Agent, or Firm* — Dority & Manning, P.A.

(57) ABSTRACT

The present disclosure is directed to a bearing for a wind turbine. The bearing includes an outer race, an inner race, and a radially-split center race configured between the inner race and the outer race. Further, the center race includes a first race portion and a separate second race portion. In addition, the first and second race portions are arranged together in an axial direction. The bearing also includes a first set of rolling elements positioned between the inner race and the center race and a second set of rolling elements positioned between the center race and the outer race.

8 Claims, 8 Drawing Sheets

(56) References Cited

U.S. PATENT DOCUMENTS

| | | |
|---|---|---|
| 2009/0285693 A1 | 11/2009 | Bech |
| 2011/0236186 A1 | 9/2011 | Bech et al. |
| 2014/0199171 A1* | 7/2014 | Jepsen .................. F16C 33/583 |
| | | 416/174 |
| 2015/0063736 A1 | 3/2015 | Minadeo |
| 2015/0139809 A1* | 5/2015 | Schroppel ............. F03D 1/0658 |
| | | 416/205 |

FOREIGN PATENT DOCUMENTS

| | | |
|---|---|---|
| EP | 1741940 A1 | 1/2007 |
| KR | 10 1345714 B1 | 12/2013 |
| WO | WO2010/037372 A1 | 4/2010 |

OTHER PUBLICATIONS

The First Examination Report for IN application No. 202017046911.
Supplementary European Search Report for EP Application No. 18917401.4, dated Oct. 22, 2021.

\* cited by examiner

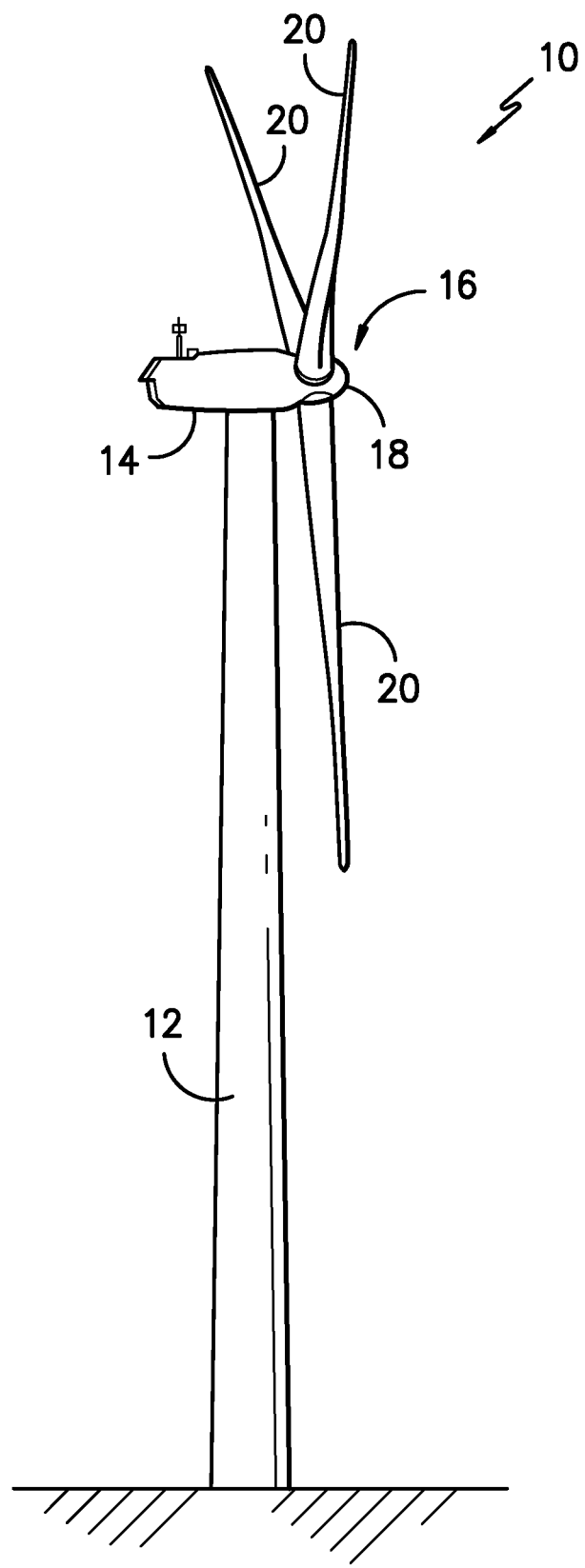
FIG. -1-

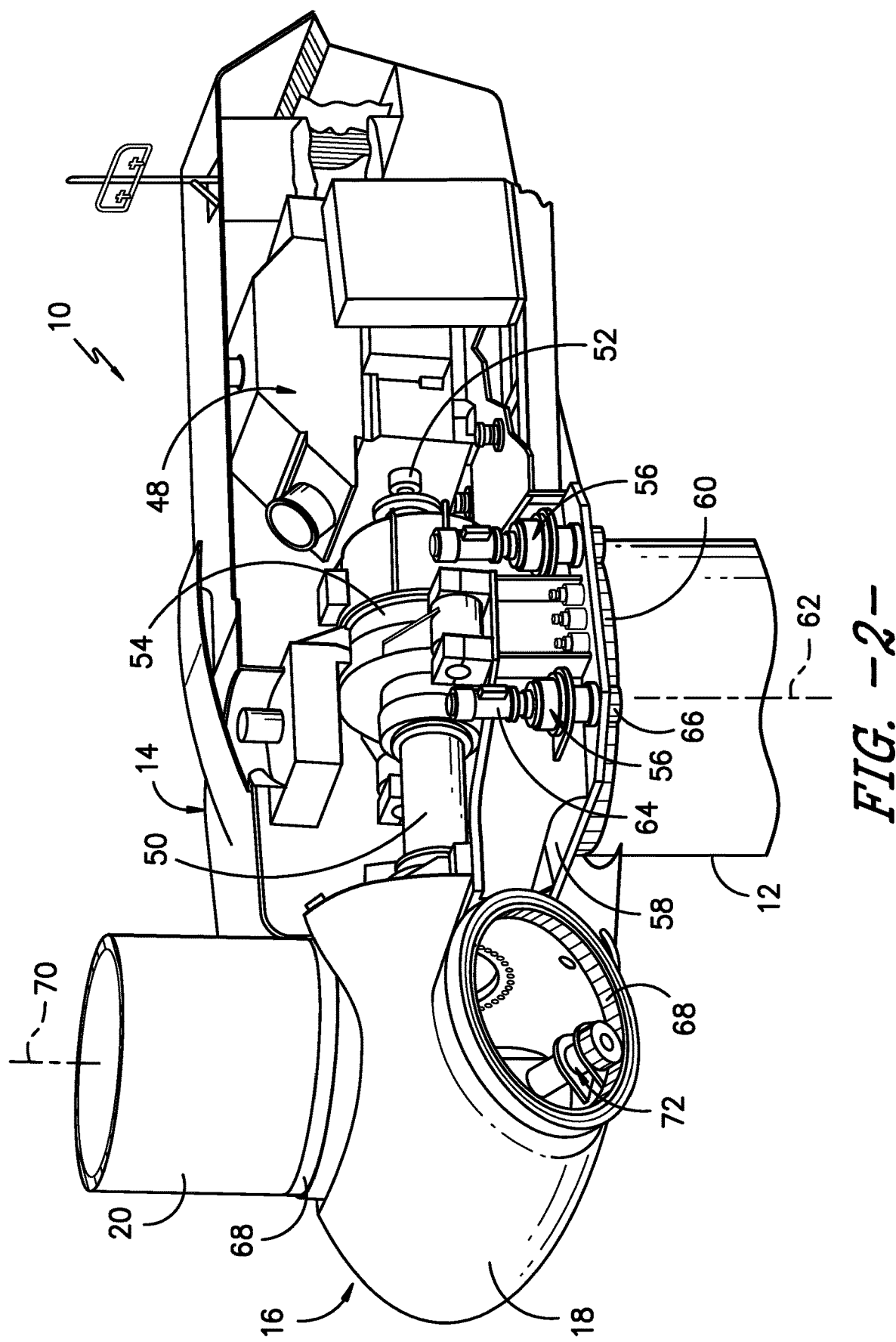
FIG. -2-

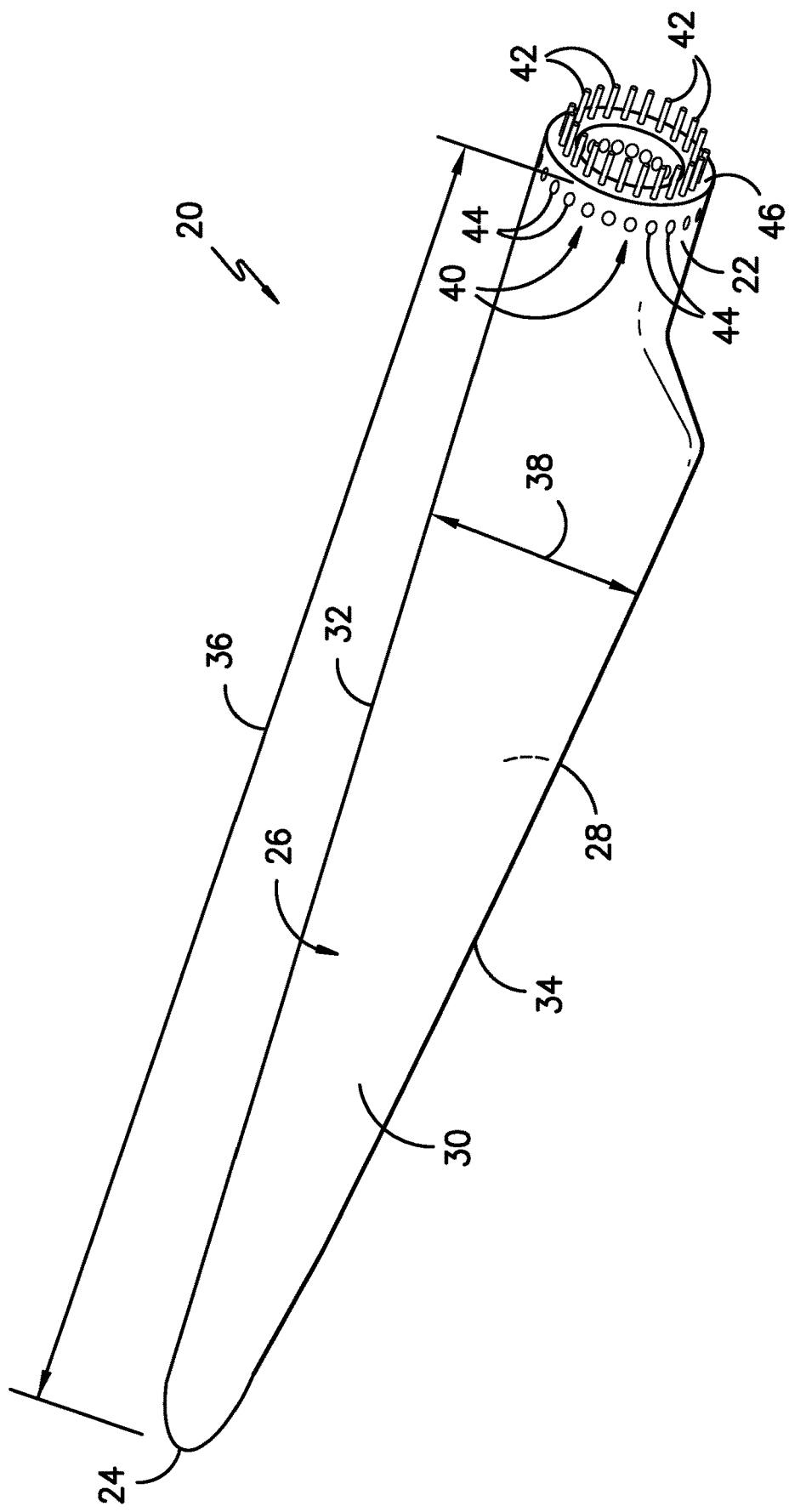
FIG. -3-

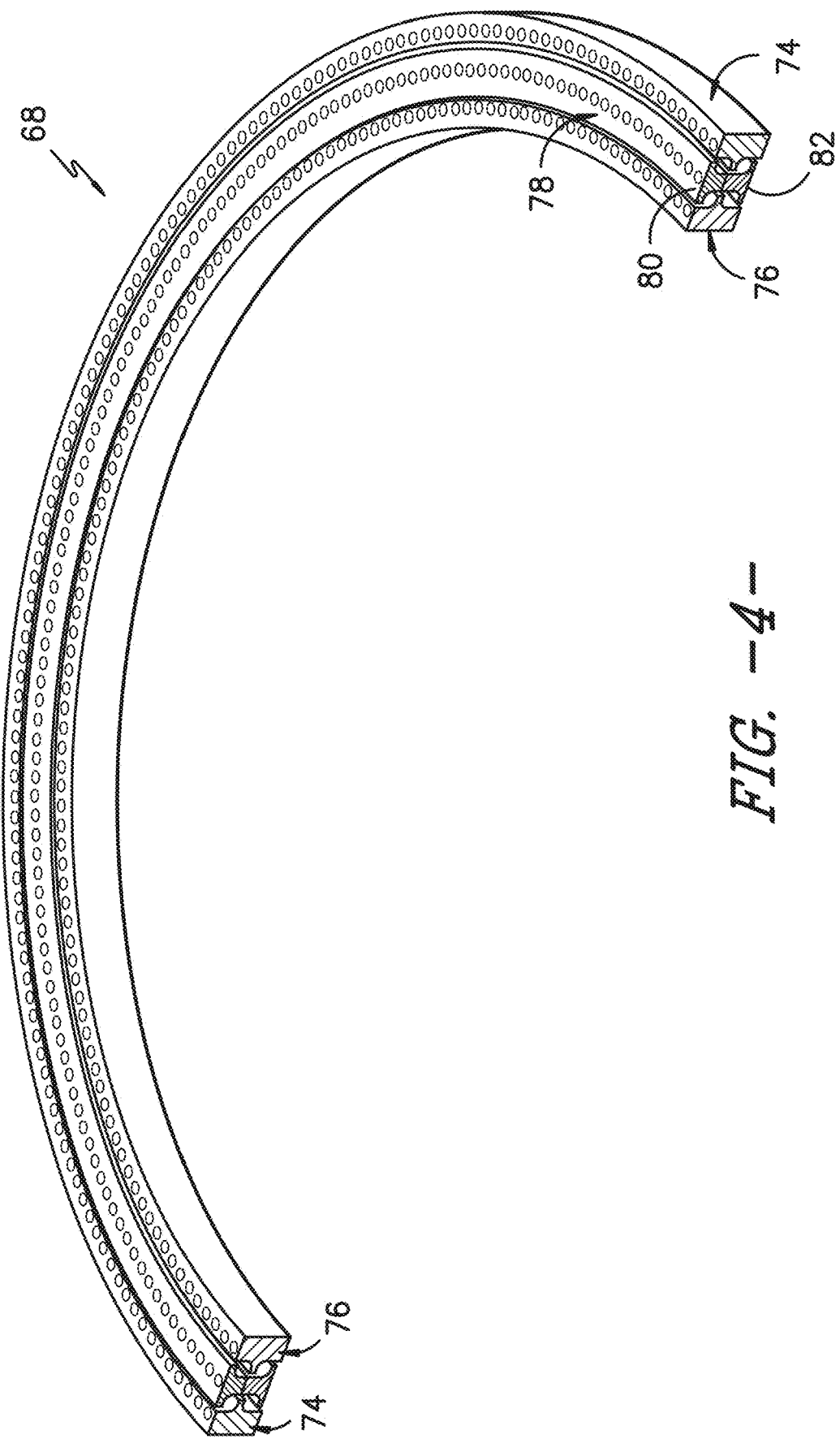
FIG. -4-

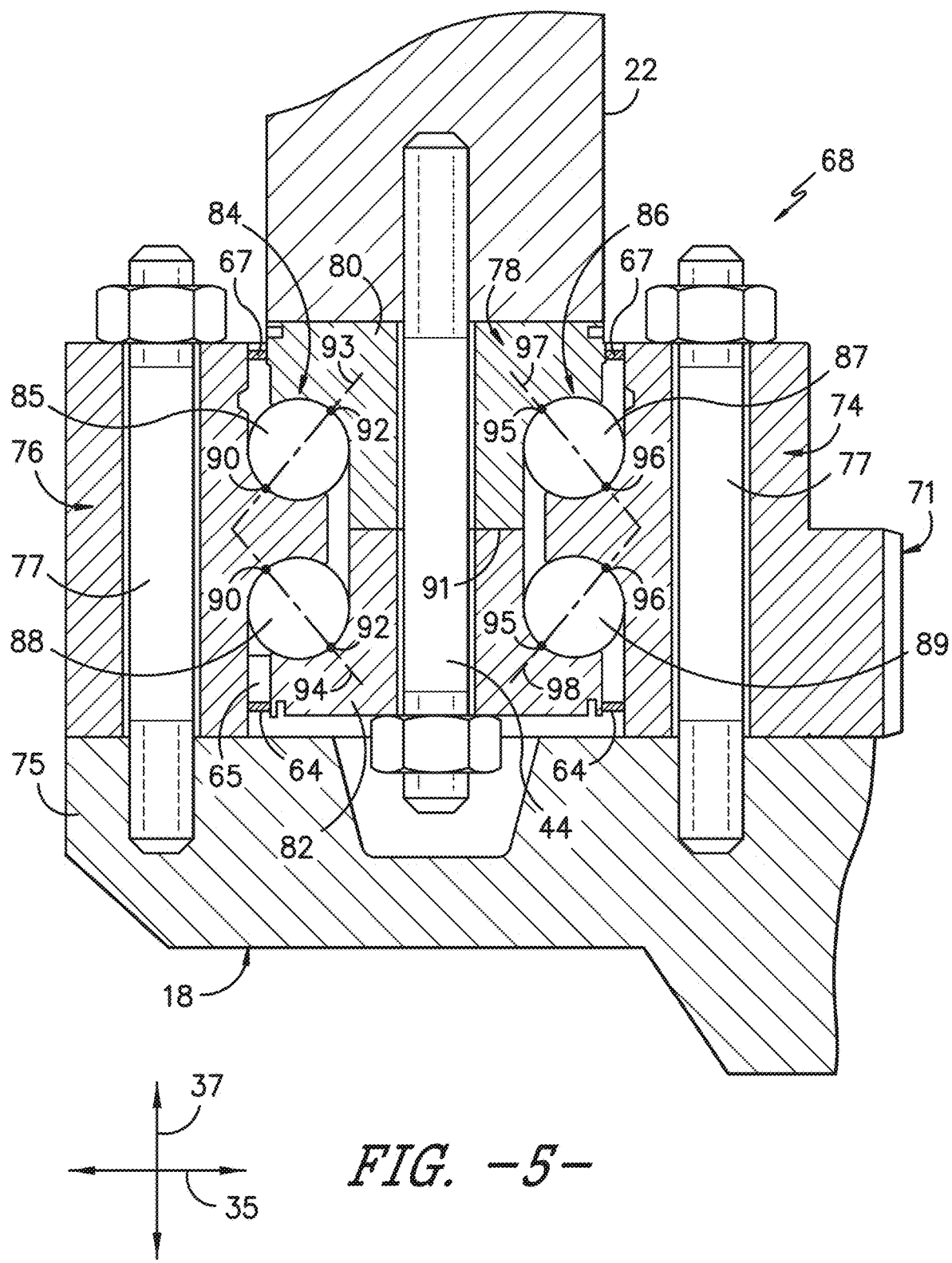
FIG. -5-

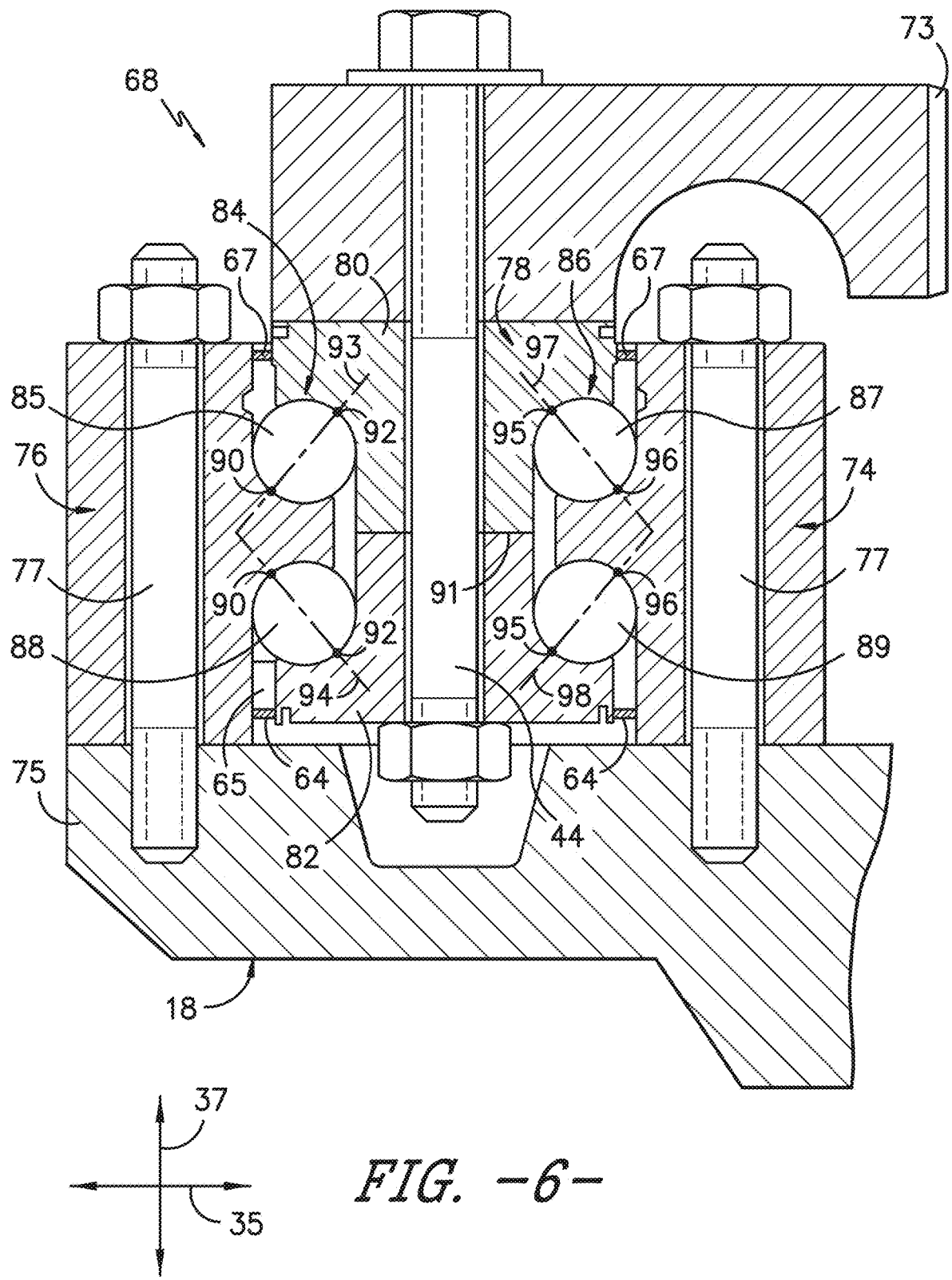
FIG. -6-

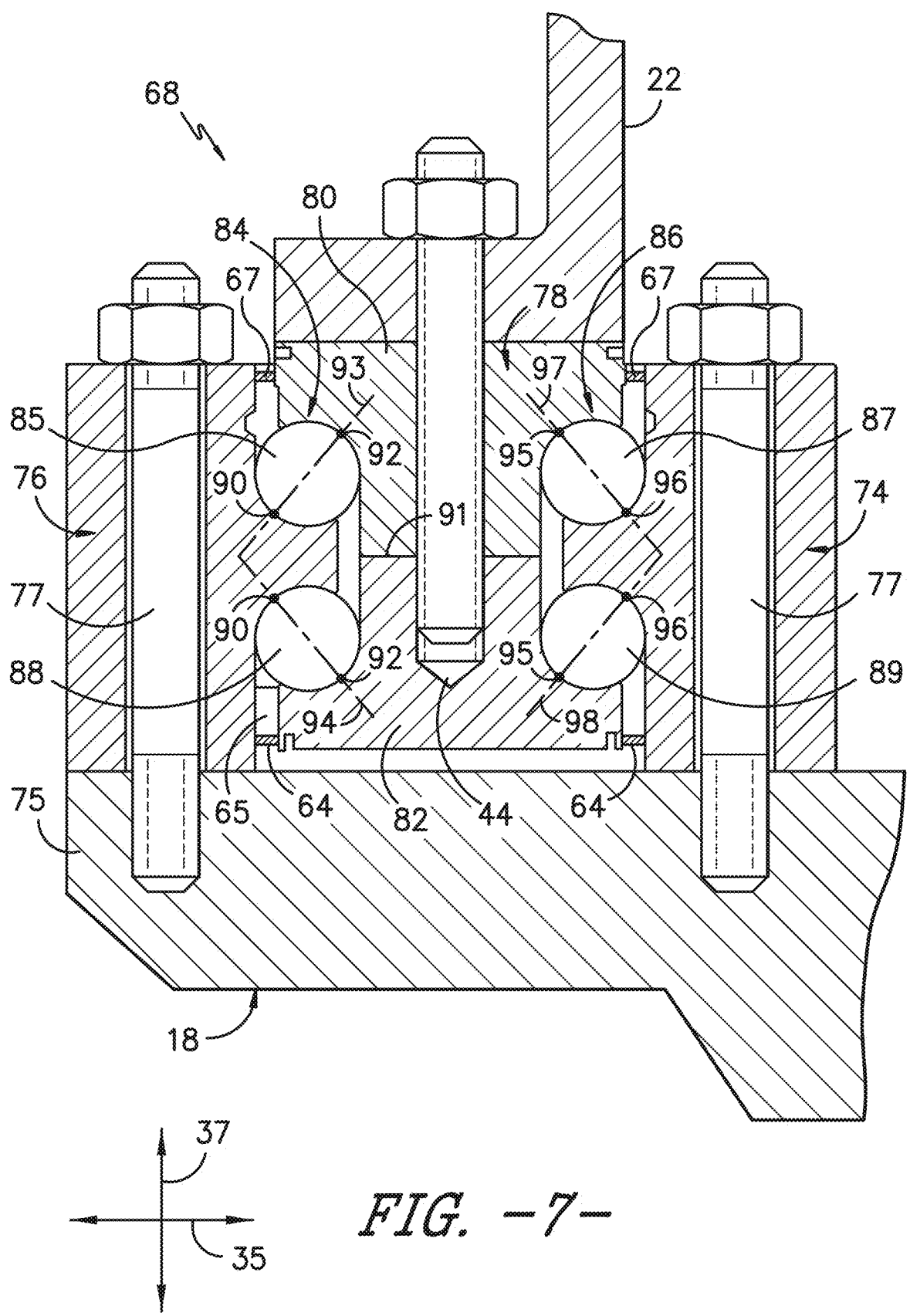
FIG. -7-

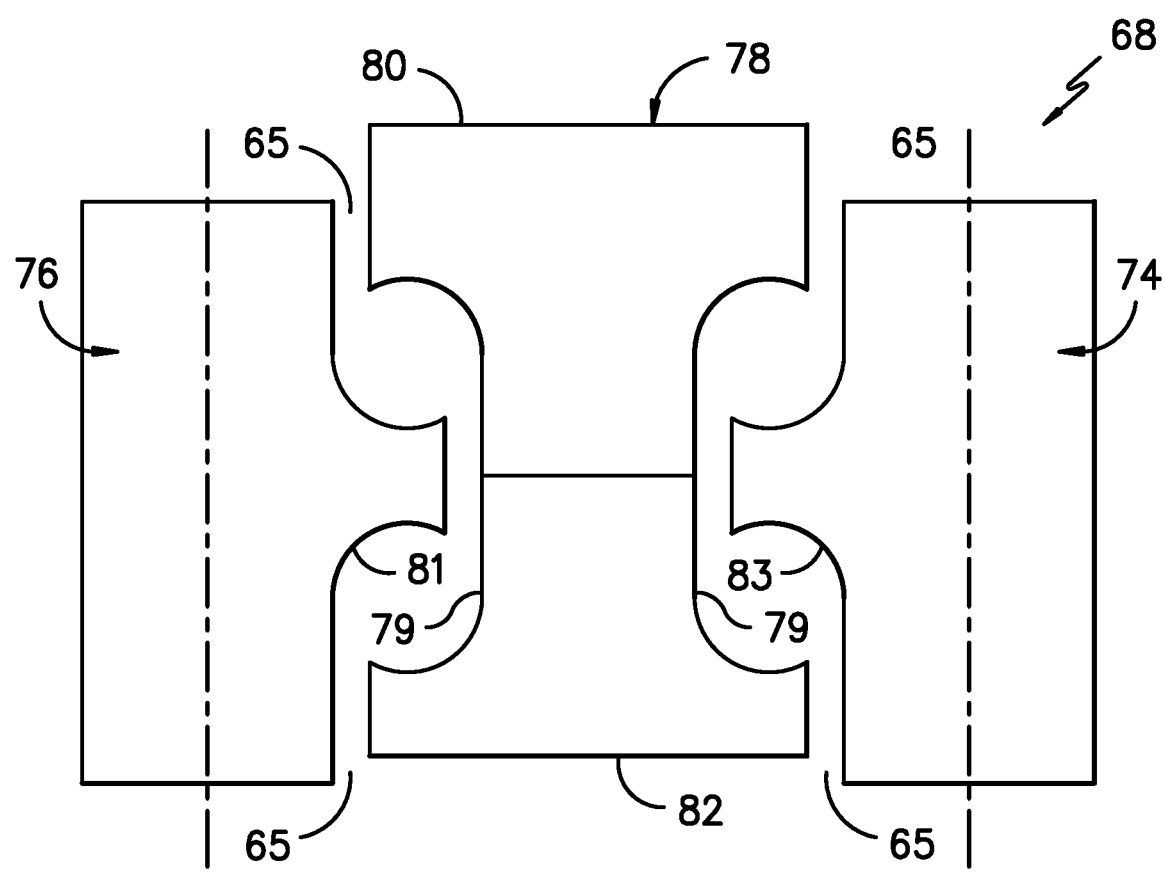
FIG. -8-

PITCH BEARING FOR A WIND TURBINE

FIELD OF THE INVENTION

The present subject matter relates generally to wind turbines and, more particularly, to pitch bearings for wind turbines.

BACKGROUND OF THE INVENTION

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The rotor blades capture kinetic energy from wind using known airfoil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

To properly orient the nacelle and the rotor blades relative to the direction of the wind, wind turbines typically include one or more yaw and/or pitch bearings. Such bearings are typically slewing bearings which are rotational ball bearings that support a heavy but slow-turning or slow-oscillating load. Typical yaw and/or pitch bearings include an outer and inner race with a plurality of ball bearings configured between the races. As such, yaw bearings permit rotation of the nacelle and are mounted between the tower and the nacelle, whereas pitch bearings permit rotation of the rotor blades and are mounted between the rotatable hub and one of the rotor blades.

As wind turbines continue to increase in size, the slewing bearings must similarly increase in size due to increased loading from longer rotor blades. With longer rotor blades also comes increased loads acting on the pitch bearing. Since pitch bearings are typically very expensive and can be difficult to access and replace, failure of pitch bearings can result in a lengthy and expensive repair process.

Accordingly, an improved bearing that addresses the aforementioned issues would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present disclosure is directed to a bearing for a wind turbine. The bearing includes an outer race, an inner race, and a radially-split center race configured between the inner race and the outer race. Further, the center race includes a first race portion and a separate second race portion. In addition, the first and second race portions are arranged together in an axial direction. The bearing also includes a first set of rolling elements positioned between the inner race and the center race and a second set of rolling elements positioned between the center race and the outer race.

In one embodiment, either or both of the first and second sets of rolling elements may include multiple rows. For example, in certain embodiments, the pitch bearing may include a first row of rolling elements and a second row of rolling elements aligned in the axial direction. In such embodiments, each of the first and second rows of rolling elements of the first and second sets may contact at least one of the inner race, the outer race, or the center race at only two contacting locations.

For example, in one embodiment, the two contacting locations for the first and second rows of the first set of rolling elements may include a first location on the inner race and a second location on the center race. More specifically, in such embodiments, in a cross-sectional view of the bearing, a first line connecting the two contacting locations of the first row of the first set of rolling elements and a second line connecting the two contacting locations for the second row of the first set of rolling elements intersect to form a first angle. In certain embodiments, the first angle may range from greater than 0 degrees to about 90 degrees. In further embodiments, the first angle may be greater than 90 degrees.

Similarly, the two contacting locations for the first and second rows of the second set of rolling elements may a first location on the center race and a second location on the outer race. Thus, in a cross-sectional view of the bearing, a first line connecting the two contacting locations of the first row of the second set of rolling elements and a second line connecting the two contacting locations for the second row of the second set of rolling elements intersect to form a second angle. In certain embodiments, the second angle may range from greater than 0 degrees to about 90 degrees. In further embodiments, the second angle may be greater than 90 degrees.

In additional embodiments, the bearing may be utilized as a pitch bearing or a yaw bearing of the wind turbine. In further embodiments, the first and second sets of rolling elements may be ball bearings.

In another aspect, the present disclosure is directed to a pitch bearing for a wind turbine. The pitch bearing includes an outer race, an inner race, and a radially-split center race configured between the inner and the outer races. In addition, the pitch bearing includes a first set of two-point contact rolling elements positioned between the inner race and the center race and a second set of two-point contact rolling elements positioned between the center race and the outer race. It should be understood that the pitch bearing may further include any one of or a combination of the features and/or embodiments as described herein.

In yet another aspect, the present disclosure is directed to a rotor assembly for a wind turbine. The rotor assembly includes a rotor having at least one rotor blade connected to a rotatable hub through a pitch bearing. The pitch bearing includes an outer race, an inner race, and a radially-split center race configured between the inner race and the outer race. Further, the center race includes a first race portion and a separate second race portion. In addition, the first and second race portions are arranged together in an axial direction. The bearing also includes a first set of rolling elements positioned between the inner race and the center race and a second set of rolling elements positioned between the center race and the outer race. It should be understood that the rotor assembly may further include any one of or a combination of the features and/or embodiments as described herein.

These and other features, aspects and advantages of the present invention will be further supported and described with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a perspective view of one embodiment of a wind turbine;

FIG. 2 illustrates a perspective, internal view of the nacelle of the wind turbine shown in FIG. 1

FIG. 3 illustrates a perspective view of one of the rotor blades of the wind turbine shown in FIG. 1;

FIG. 4 illustrates an isometric view of a three-ring pitch bearing according to the present disclosure;

FIG. 5 illustrates a detailed, cross-sectional view of one embodiment of a three-ring pitch bearing connected between a hub and a rotor blade according to the present disclosure, particularly illustrating the inner and outer races configured to rotate with respect to the center race;

FIG. 6 illustrates a detailed, cross-sectional view of another embodiment of a three-ring pitch bearing connected between a hub and a rotor blade according to the present disclosure, particularly illustrating the center race configured to rotate with respect to the inner and outer races;

FIG. 7 illustrates a detailed, cross-sectional view of yet another embodiment of a three-ring pitch bearing connected between a hub and a rotor blade according to the present disclosure; and FIG. 8 illustrates a cross-sectional view of one embodiment of a three-ring pitch bearing according to the present disclosure.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a three-ring pitch bearing for a wind turbine having an outer race, an inner race, and a radially split center race configured between the inner and the outer races. Further, the center race includes a first race portion and a separate second race portion. In addition, the first and second race portions are arranged together in an axial direction. The bearing also includes a first set of rolling elements positioned between the inner race and the center race and a second set of rolling elements positioned between the center race and the outer race. Moreover, the split center race allows the rolling elements to achieve the two-point contact of the rolling elements as described herein.

As such, the pitch bearing of the present disclosure provides numerous advantages not present in the cited art. For example, the pitch bearing of the present disclosure can handle increased loads due to larger rotor blades without requiring larger ball bearings or more expensive roller bearings. In addition, the pitch bearing includes two-point contact ball bearings, rather than four-point contact ball bearings, which require more complex machining and/or tolerances between the races. In addition, four-point contact ball bearings inherently limit the geometry of the bearing, meaning that in order to support higher loads, the bearing size and cost increases. For example, in order to machine all four-points in contact, the raceway of the bearing cannot surround more than half of an individual ball bearing, whereas for a two-point contact ball bearing, the raceway can surround much more of the ball bearing.

The present invention is described herein as it may relate to wind turbine bearings, including, at least, yaw bearings, pitch bearings, and/or similar. It should be appreciated, however, that the unique bearings in accordance with principles of the present invention is not limited to use with a wind turbine, but is applicable to any suitable bearing application.

Referring now to the drawings, FIG. 1 illustrates a perspective view of one embodiment of a wind turbine 10. As shown, the wind turbine 10 generally includes a tower 12, a nacelle 14 mounted on the tower 12, and a rotor 16 coupled to the nacelle 14. The rotor 16 includes a rotatable hub 18 and at least one rotor blade 20 coupled to and extending outwardly from the hub 18. For example, in the illustrated embodiment, the rotor 16 includes three rotor blades 20. However, in an alternative embodiment, the rotor 16 may include more or less than three rotor blades 20. Each rotor blade 20 may be spaced about the hub 18 to facilitate rotating the rotor 16 to enable kinetic energy to be transferred from the wind into usable mechanical energy, and subsequently, electrical energy. For instance, the hub 18 may be rotatably coupled to an electric generator 48 (FIG. 2) positioned within the nacelle 14 to permit electrical energy to be produced.

Referring now to FIG. 2, a simplified, internal view of one embodiment of the nacelle 14 of the wind turbine 10 shown in FIG. 1 is illustrated. As shown, a generator 48 may be disposed within the nacelle 14. In general, the generator 48 may be coupled to the rotor 16 of the wind turbine 10 for generating electrical power from the rotational energy generated by the rotor 16. For example, the rotor 16 may include a rotor shaft 50 coupled to the hub 18 for rotation therewith. The generator 48 may then be coupled to the rotor shaft 50 such that rotation of the rotor shaft 50 drives the generator 48. For instance, in the illustrated embodiment, the generator 48 includes a generator shaft 52 rotatably coupled to the rotor shaft 50 through a gearbox 54. However, in other embodiments, it should be appreciated that the generator shaft 52 may be rotatably coupled directly to the rotor shaft 50. Alternatively, the generator 48 may be directly rotatably coupled to the rotor shaft 50 (often referred to as a "direct-drive wind turbine").

Additionally, the wind turbine 10 may include one or more yaw drive mechanisms 56 mounted to and/or through a bedplate 58 positioned atop the wind turbine tower 12. Specifically, each yaw drive mechanism 56 may be mounted to and/or through the bedplate 58 so as to engage a yaw bearing 60 coupled between the bedplate 58 and the tower 12 of the wind turbine 10. The yaw bearing 60 may be mounted to the bed plate 58 such that, as the yaw bearing 60 rotates about a yaw axis 62 of the wind turbine 10, the bedplate 58 and, thus, the nacelle 14 are similarly rotated about the yaw axis.

In general, it should be appreciated that the yaw drive mechanisms 56 may have any suitable configuration and may include any suitable components known in the art that allow such mechanisms 56 to function as described herein.

For example, as shown in FIG. 2, each yaw drive mechanism 56 may include a yaw motor 64 mounted to the bedplate 234. The yaw motor 64 may be coupled to a yaw gear 66 (e.g., a pinion gear) configured to engage the yaw bearing 60. For instance, the yaw motor 64 may be coupled to the yaw gear 66 directly (e.g., by an output shaft (not shown) extending through the bedplate 58) or indirectly through a suitable gear assembly coupled between the yaw motor 64 and the yaw gear 66. As such, the torque generated by the yaw motor 64 may be transmitted through the yaw gear 66 and applied to the yaw bearing 60 to permit the nacelle 14 to be rotated about the yaw axis 62 of the wind turbine 10. It should be appreciated that, although the illustrated wind turbine 10 is shown as including two yaw drive mechanisms 56, the wind turbine 10 may generally include any suitable number of yaw drive mechanisms 56. Similarly, it should be appreciated that the yaw bearing 60 may generally have any suitable configuration, including one or more of the bearing configurations described below.

Referring still to FIG. 2, the wind turbine 10 may also include a plurality of pitch bearings 68, with each pitch bearing 68 being coupled between the hub 18 and one of the rotor blades 20. As will be described below, the pitch bearings 68 may be configured to allow each rotor blade 20 to be rotated about its pitch axis 70 (e.g., via a pitch adjustment mechanism), thereby allowing the orientation of each blade 20 to be adjusted relative to the direction of the wind. It should be appreciated that, as used herein, the term "slewing bearing" may be used to refer to the yaw bearing 60 of the wind turbine 10 and/or one of the pitch bearings 68 of the wind turbine 10 or any other similar bearing.

Referring now to FIG. 3, a perspective view of one of the rotor blades 20 shown in FIGS. 1 and 2 is illustrated in accordance with aspects of the present subject matter. As shown, the rotor blade 20 includes a blade root 22 configured for mounting the rotor blade 20 to the hub 18 of a wind turbine 10 (FIG. 1) and a blade tip 24 disposed opposite the blade root 22. A body 26 of the rotor blade 20 may extend lengthwise between the blade root 22 and the blade tip 24 and may generally serve as the outer shell of the rotor blade 20. As is generally understood, the body 26 may define an aerodynamic profile (e.g., by defining an airfoil shaped cross-section, such as a symmetrical or cambered airfoil-shaped cross-section) to enable the rotor blade 20 to capture kinetic energy from the wind using known aerodynamic principles. Thus, the body 26 may generally include a pressure side 28 and a suction side 30 extending between a leading edge 32 and a trailing edge 34. Additionally, the rotor blade 20 may have a span 36 defining the total length of the body 26 between the blade root 22 and the blade tip 24 and a chord 38 defining the total length of the body 26 between the leading edge 32 and the trailing edge 34. As is generally understood, the chord 38 may vary in length with respect to the span 26 as the body 26 extends from the blade root 22 to the blade tip 24.

Moreover, as shown, the rotor blade 20 may also include a plurality of T-bolts or root attachment assemblies 40 for coupling the blade root 20 to the hub 18 of the wind turbine 10. In general, each root attachment assembly 40 may include a barrel nut 42 mounted within a portion of the blade root 22 and a root bolt 44 coupled to and extending from the barrel nut 42 so as to project outwardly from a root end 46 of the blade root 22. By projecting outwardly from the root end 46, the root bolts 44 may generally be used to couple the blade root 22 to the hub 18 (e.g., via one of the pitch bearings 50), as will be described in greater detail below.

Referring now to FIGS. 4-8, various views of the pitch bearing 68 in accordance with aspects of the present disclosure are illustrated. As generally shown, the pitch bearing 68 includes an outer race 74, an inner race 76, a radially split center race 78 configured between the inner and outer races 74, 76 and a plurality of rolling elements 84, 86 disposed between the races 74, 76, 78. For example, in one embodiment, the rolling elements 84, 86 may be ball bearings. More specifically, as shown, the center race 78 has a radially-split configuration (i.e. split in a radial direction as indicated by arrow 35) with a first race portion 80 and a separate second race portion 82 aligned in an axial direction 37. More specifically, as shown, the center race 78 is split horizontally along split line 91. Moreover, the first and second portions 80, 82 may be symmetrical or asymmetrical. In addition, as shown in FIG. 6, the center race 78 is rotatable relative to the inner and outer races 74, 76 via the rolling elements 84, 86. Alternatively, as shown in FIG. 5, the inner and outer races 74, 76 may be rotatable relative to the center race 78. More specifically, as shown, the pitch bearing 68 includes a first set 84 of rolling elements positioned between the inner race 76 and the first race portion 80 of the center race 78 and a second set 86 of rolling elements positioned between the second race portion 82 of the center race 78 and the outer race 74. For example, as shown in FIG. 8, the rolling elements 84, 86 may be positioned within one or more raceways 79, 81, 83 of the races 74, 76, 78.

Further, as shown in FIG. 5, the outer and inner races 74, 76 may generally be configured to be mounted to a hub flange 75 of the hub 18 using a plurality of hub bolts 77 and/or other suitable fastening mechanisms. Similarly, the center race 78 may be configured to be mounted to the blade root 22 using the root bolts 44 of the root attachment assemblies 40. For example, as shown in FIG. 5, each root bolt 44 may extend between a first end 45 and a second end 47. As such, the first end 45 may be configured to be coupled to a portion of the center race 78, such as by coupling the first end 45 to the center race 78 using an attachment nut and/or other suitable fastening mechanism. The second end 47 of each root bolt 44 may be configured to be coupled to the blade root 22 via the barrel nut 42 of each root attachment assembly 40. Thus, the center race 78 may be configured to rotate relative to the outer and inner races 74, 76 (via the rolling elements 84, 86 that are rotated via a pitch adjustment mechanism that engage teeth 71) to allow the pitch angle of each rotor blade 20 to be adjusted.

In alternative embodiments, as shown in FIG. 6, the outer and inner races 74, 76 may be configured to rotate relative to the center race 78. In such an embodiment, the center race 78 may include a plurality of teeth 73 configured to engage a pitch adjustment mechanism as discussed below.

As shown in FIG. 5, such relative rotation of the outer and inner races 74, 76 may be achieved using a pitch adjustment mechanism (not shown), for example, mounted within a portion of the hub 18. In general, the pitch adjustment mechanism may include any suitable components and may have any suitable configuration that allows the mechanism to function as described herein. For example, in certain embodiments, the pitch adjustment mechanism may include a pitch drive motor (e.g., an electric motor), a pitch drive gearbox, and a pitch drive pinion. In such an embodiment, the pitch drive motor may be coupled to the pitch drive gearbox so that the motor imparts mechanical force to the pitch drive gearbox. Similarly, the pitch drive gearbox may be coupled to the pitch drive pinion for rotation therewith. The pinion may, in turn, be in rotational engagement with one of the races 74, 76, 78. For example, a plurality of gear teeth (e.g. teeth 71, 73) may be formed along the inner circumference of the one of the races 74, 76, 78 (i.e. to the center race 78 or the inner and outer races 74, 76), with the gear teeth 71, 73 being configured to mesh with corresponding gear teeth formed on the pinion. Thus, due to meshing of the gear teeth, rotation of the pitch drive pinion results in rotation of center race 78 relative to the outer and inner races 74, 76 and, thus, rotation of the rotor blade 20 relative to the hub 18. In addition, the races 74, 76, 78 may be rotated relative to each using any other suitable means including, for example, hydraulics.

In addition, either or both of the first and second sets 84, 86 of rolling elements may include multiple rows, for example, a first row 85, 87 of rolling elements and a second row 88, 89 of rolling elements aligned in the axial direction 37. In such embodiments, each of the first and second rows 85, 87, 88, 89 of rolling elements of the first and second sets 84, 86 contacts at least one of the inner race 76, the outer race 74, and/or the center race 78 at only two contacting locations.

More specifically, as shown in the illustrated embodiment, the two contacting locations for the first and second rows 85, 88 of the first set 84 of rolling elements may include a first location 90 on the inner race 76 and a second location 92 on the first race portion 80 of the center race 78. Thus, as shown, in a cross-sectional view of the pitch bearing 68 as shown in FIGS. 5-7, a first line 93 connecting the two contacting locations 90, 92 of the first row 85 of the first set 84 of rolling elements and a second line 94 connecting the two contacting locations 90, 92 for the second row 88 of the first set 84 of rolling elements may intersect to form a first angle, which can be optimized for each bearing. In certain embodiments, the first angle may range from about 0 degrees to about 90 degrees. For example, as shown, the first angle is about 90 degrees. In additional embodiments, the first angle may be greater than 90 degrees.

Similarly, the two contacting locations 95, 96 for the first and second rows 87, 89 of the second set 86 of rolling elements may include a first location 95 on the second race portion 82 of the center race 78 and a second location 96 on the outer race 74. Thus, in a cross-sectional view of the pitch bearing 68 as shown in FIGS. 5-7, a first line 97 connecting the two contacting locations 95, 96 of the first row 87 of the second set 86 of rolling elements and a second line 98 connecting the two contacting locations 95, 96 for the second row 89 of the first set 86 of rolling elements intersect to form a second angle. In certain embodiments, the second angle may range from about 0 degrees to about 90 degrees. For example, as shown, the second angle is about 90 degrees. As such, for the illustrated embodiments, the two contacting locations for each of the rolling elements are spaced approximately 180-degrees apart. In additional embodiments, the second angle may be greater than 90 degrees. It should also be understood that the first and second angles may be equal or different.

In further embodiments, the closer the first and second contact angles are to the axial direction 37, the more capable the bearing 68 may be against fatigue loads cycles, i.e. caused by a plurality of load cycles. Alternatively, the closer the first and second contact angles are to the radial direction 35, the more capable the bearing 68 may be against extreme loads. Thus, the bearing 68 of the present disclosure allows all raceway contact angles to be optimized and separate angles.

Referring particularly to FIG. 8, a cross-sectional view of the bearing 68 is illustrated to further example the assembly of the bearing 68. More specifically, as shown, the second race portion 82 of the center race 78 can be lowered onto a surface. A portion of the rolling elements 84, 86 can then be placed within the lower portion of the raceway 79 of the center race 78. As such, the inner and outer races 74, 76 can then be lowered around the center race 78 containing the lower row of the rolling elements 84, 86, such that the lower row of rolling elements 84, 86 fit within the raceways 81, 83 of the inner and outer races 74, 76, respectively. A top row of rolling elements 84, 86 can then be placed within the upper raceways between the inner and outer races 74, 76 and the center race 78. The first race portion 80 of the center race 78 can then be secured atop the second race portion 82 of the center race 78.

In addition, any suitable number of rolling elements 84, 86 may be employed. Further, the rolling elements 84, 86 may be arranged in any suitable configuration. For example, as mentioned, two rows of rolling elements 84, 86 may be employed, wherein each of the rolling elements 84, 86 are circumferentially spaced between the outer and inner races 76, 74. In another embodiment, a single row or multiple, axially-spaced rows of rolling elements 84, 86 may be utilized in the pitch bearing 68 to provide additional strength. For example, in various embodiments, three or more rows of rolling elements 84, 86 may be employed.

Additionally, in several embodiments, a plurality of lubrication ports 65 may be defined through the races 74, 76, 78. In general, each lubrication port 65 may be configured to supply a suitable lubricant (e.g., grease, etc.) from a location outside the pitch bearing 68 to a location between the races 74, 76, 78. In addition, to maintain the lubricant within the pitch bearing 68, any gaps defined between the races 74, 76, 78 may be sealed using suitable sealing mechanisms. For instance, as shown in FIGS. 5-7, the pitch bearing 68 includes a plurality of sealing mechanisms 67 configured between the races 74, 76, 78 so as to maintain the lubricant within the bearing 68.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A slewing ring bearing for a wind turbine comprising:
   an outer race;
   an inner race;
   a radially-split center race configured between the inner race and the outer race, the radially-split center race constructed of a first race portion and a separate, second race portion, the first race portion and the second race portion being arranged together in an axial direction, wherein, in a cross-sectional view of the bearing, a first path is defined between the inner race and the radially-split center race and, in a cross-sectional view of the bearing, a second path is defined between the outer race and the radially-split center race;
   a first set of ball bearings comprising at least a first row of ball bearings and a second row of ball bearings positioned between the inner race and the radially-split center race in the axial direction, wherein, in a cross-sectional view of the bearing, the first path extends from the first row ball bearings and the second row of ball bearings of the first set of ball bearings in the axial direction; and a second set of ball bearings comprising at least a first row of ball bearings and a second row of ball bearings positioned between the outer race and the radially-split center race in the axial direction, wherein, in a cross-sectional view of the bearing, the second path extends from the first row ball bearings and the second row of ball bearings of the second set of ball bearings in the axial direction;

wherein the first row of ball bearings of the first set of ball bearings contacts the inner race at only one contacting point location and the second row of ball bearings of the first set of ball bearings contacts the radially-split center race at only one contacting point location for a total of only two contacting point locations for the first set of ball bearings, and wherein the first row of ball bearings of the second set of ball bearings contacts the outer race at only one contacting point location and the second row of ball bearings of the second set of ball bearings contacts the radially-split center race at only one contacting point location for a total of only two contacting point locations for the second set of ball bearings, and wherein the radially-split center race allows each of the first and second sets of ball bearings to achieve only two-point contact.

2. The slewing ring bearing of claim 1, wherein, in a cross-sectional view of the bearing, a first line connecting the only two contacting point locations of the first set of ball bearings and a second line connecting the only two contacting point locations for the second set of ball bearings intersect to form a first angle, the first angle being in range of greater than 0 degrees to 90 degrees.

3. The slewing ring bearing of claim 1, wherein, in a cross-sectional view of the bearing, a first line connecting the two contacting point locations of the first set of ball bearings and a second line connecting the two contacting point locations for the second set of ball bearings intersect to form a second angle, the second angle being in range of greater than 0 degrees to 90 degrees.

4. The slewing ring bearing of claim 1, wherein the bearing comprises at least one of a pitch bearing or a yaw bearing of the wind turbine.

5. A rotor assembly for a wind turbine comprising:
a rotor comprising at least one rotor blade connected to a rotatable hub through a pitch bearing, the pitch bearing being a slewing ring bearing that is comprising:
an outer race;
an inner race;
a radially-split center race configured between the inner race and the outer race, the radially-split center race constructed of a first race portion and a separate, second race portion, the first race portion and the second race portion being arranged together in an axial direction, wherein, in a cross-sectional view of the bearing, a first path is defined between the inner race and the radially-split center race and, in a cross-sectional view of the bearing, a second path is defined between the outer race and the radially-split center race;

a first set of ball bearings comprising at least a first row of ball bearings and a second row of ball bearings positioned between the inner race and the radially-split center race in the axial direction, wherein, in a cross-sectional view of the bearing, the first path extends from the first row ball bearings and the second row of ball bearings of the first set of ball bearings in the axial direction; and a second set of ball bearings comprising at least a first row of ball bearings and a second row of ball bearings positioned between the outer race and the radially-split center race in the axial direction, wherein, in a cross-sectional view of the bearing, the second path extends from the first row ball bearings and the second row of ball bearings of the second set of ball bearings in the axial direction, wherein the first row of ball bearings of the first set of ball bearings contacts the inner race at only one contacting point location and the second row of ball bearings of the first set of ball bearings contacts the radially-split center race at only one contacting point location for a total of only two contacting point locations for the first set of ball bearings, and wherein the first row of ball bearings of the second set of ball bearings contacts the outer race at only one contacting point location and the second row of ball bearings of the second set of ball bearings contacts the radially-split center race at only one contacting point location for a total of only two contacting point locations for the second set of ball bearings, and wherein the radially-split center race allows each of the first and second sets of ball bearings to achieve only two-point contact.

6. The rotor assembly of claim 5, wherein, in a cross-sectional view of the bearing, a first line connecting the only two contacting point locations of the first set of ball bearings and a second line connecting the only two contacting point locations for the second set of ball bearings intersect to form a first angle, the first angle being in range of greater than 0 degrees to 90 degrees.

7. The rotor assembly of claim 5, wherein, in a cross-sectional view of the bearing, a first line connecting the two contacting point locations of the first set of ball bearings and a second line connecting the two contacting point locations for the second set of ball bearings intersect to form a second angle, the second angle being in range of greater than 0 degrees to 90 degrees.

8. The rotor assembly of claim 5, wherein the radially-split center race is secured to the rotor blade and the inner and outer races are secured to the rotatable hub.

* * * * *